UNITED STATES PATENT OFFICE.

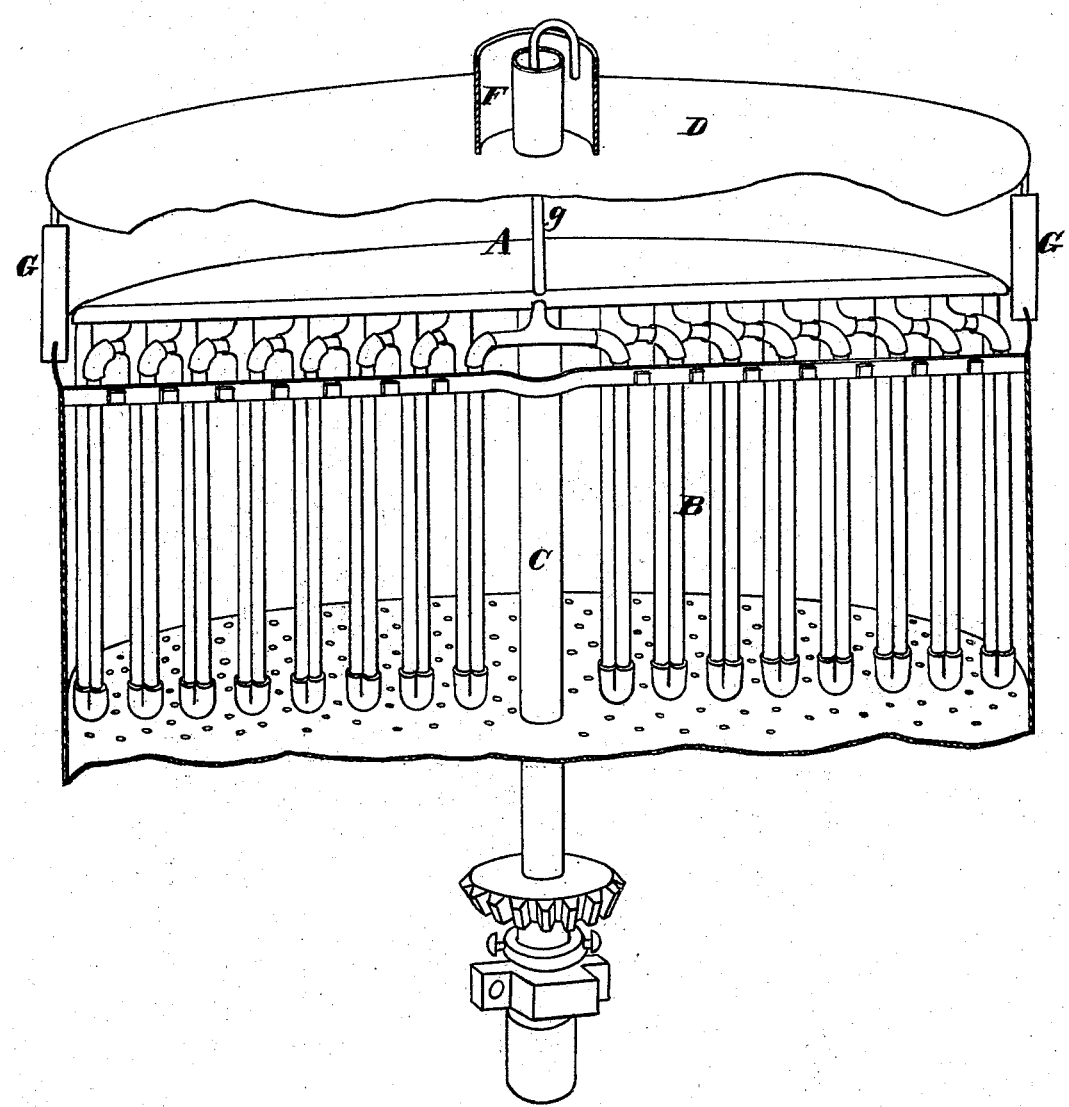

WILLIAM PADDON, OF SAN FRANCISCO, CALIFORNIA.

IMPROVEMENT IN MASH-ATTEMPERATORS.

Specification forming part of Letters Patent No. 171,310, dated December 21, 1875; application filed October 9, 1875.

*To all whom it may concern:*

Be it known that I, WILLIAM PADDON, of San Francisco city and county, State of California, have invented an Improved Mash-Attemperator; and I do hereby declare the following description and accompanying drawings are sufficient to enable any person skilled in the art or science to which it most nearly appertains to make and use my said invention or improvement without further invention or experiment.

My invention relates to that class of mash-tuns in which a tubular rotating rake, through which steam is passed, is used for agitating and heating the mash.

Heretofore the steam which entered the tubular rake was exhausted inside of the mash-tun and directly into the mash, thus not only scalding the goods, but diluting them to such an extent that their value was impaired.

My improvement consists in exhausting the steam from the hollow rake into the open air, so as to avoid all danger of scalding or diluting the goods, and at the same time give me better control of the temperature of the mash in the tun.

In order to more fully describe my invention, reference is had to the accompanying drawing, in which—

Figure 1 is a sectional elevation.

Let A designate the mash-tun. B is a rake, which is constructed of tubes, connected together in such a manner that a free circulation of steam or other vapor or fluid can be maintained throughout every part. This rake is arranged to rotate about an upright hollow shaft, C, in the center of the mash-tun. The upper main horizontal tube of the rake connects with the hollow upright tube or shaft C, about which the rake revolves, so that the steam, which is introduced into the lower end of this upright shaft, will enter the horizontal tube, and from it circulate through the tubular teeth of the rake. The coiled or bent tube, which forms the teeth of the rake, finally connects with an upright tube, *g*, which passes upward through the center of the top or cover D of the mash-tun, and has its upper end bent downward, as shown, and through which the steam is exhausted into an annular vessel, F, on top of the cover.

The cover D is supported on standards G G, the lower ends of which are split, so as to straddle the upper edge of the vessel A, over which they are loosely placed, so that they can be shifted to any desired point, or removed entirely, as desired.

By this arrangement the caloric from the steam in the hollow rake-teeth is imparted to the mash in the tun, and the mash is thoroughly agitated at the same time, so as to preserve a uniform temperature during the entire treatment without danger of scalding or overdiluting the mash.

Having thus described my invention, what I claim, and desire to secure by Letters Patent, is—

The mash-tun A, having the hollow tubular rake B, which is arranged to take steam from the upright hollow central shaft C, and exhaust it through the exhaust-pipe *g* into the open air, substantially as and for the purpose described.

WILLIAM PADDON.

Witnesses:
GEO. H. STRONG,
JNO. L. BOONE.